Patented Jan. 26, 1926.

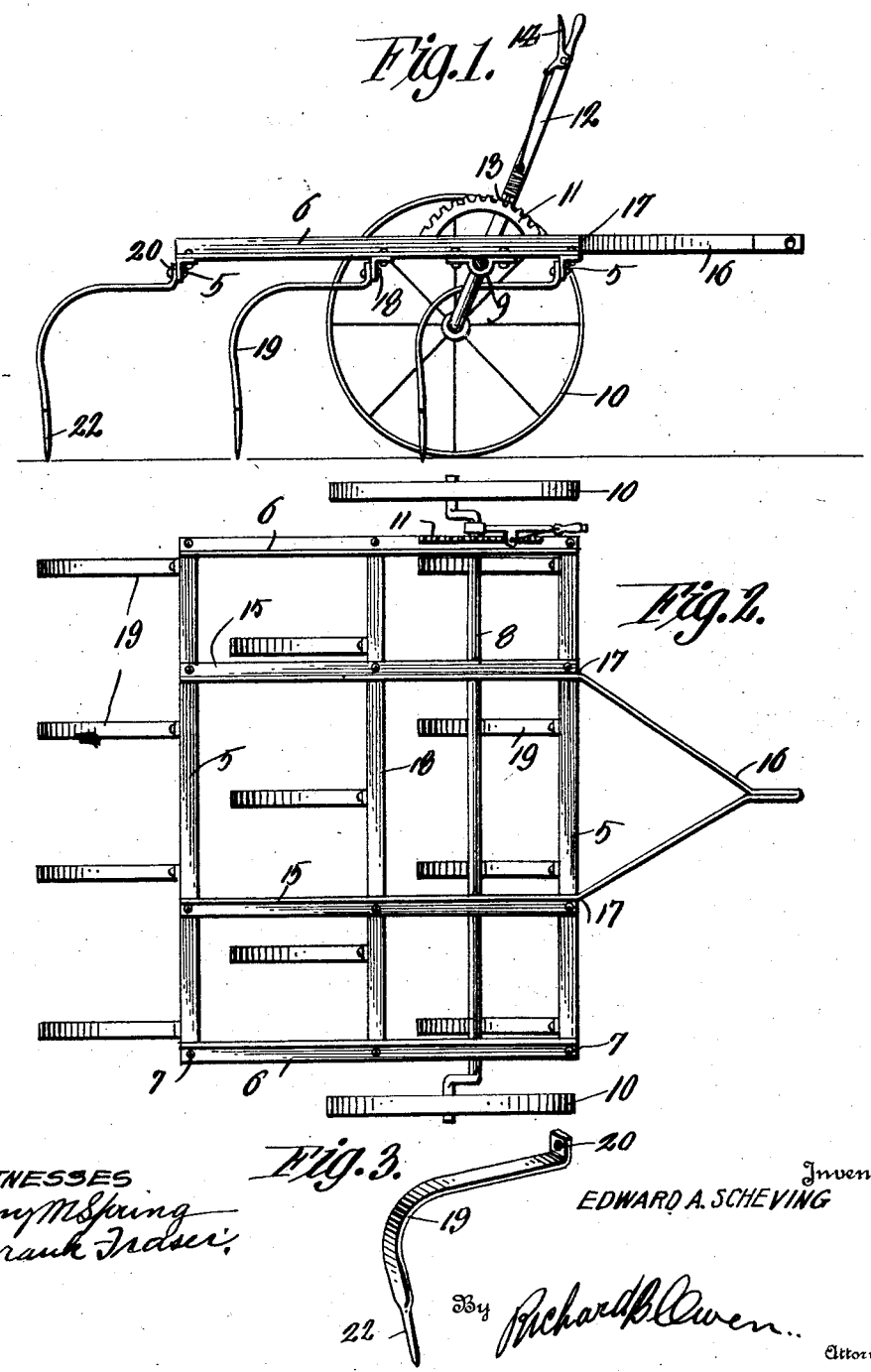

1,570,782

UNITED STATES PATENT OFFICE.

EDWARD A. SCHEVING, OF HENSEL, NORTH DAKOTA.

ROW WEEDER.

Application filed March 27, 1923. Serial No. 628,161.

*To all whom it may concern:*

Be it known that I, EDWARD A. SCHEVING, a citizen of the United States, residing at Hensel, in the county of Pembina and State of North Dakota, have invented certain new and useful Improvements in a Row Weeder, of which the following is a specification.

The present invention relates to a row weeder, and has particular reference to a wheeled spring tooth carrying frame that may be connected to the ordinary form of cultivator now in use.

An important object of my invention is to provide a wheeled row weeder of this class, that is provided with means whereby the spring teeth may be adjusted vertically so as to regulate their cutting depth.

Another important object of the invention, is to so construct a row weeder of this class, that it may be used either in conjunction with any form of cultivator, or if it is so desired may be operated independently of any other mechanism.

A still further object of the invention is to provide a row weeder of this class, wherein the spring teeth are so arranged, that a given area may be entirely rid of weeds or other obnoxious vegetation that is commonly found in rows of crops such, for instance, as corn and potatoes.

A still further object of the invention is to provide a row weeder of this class, that is exceptionally strong and durable, the parts thereof being simple and inexpensive in construction, and being so assembled that any part thereof may be easily replaced when desired. This weeder is exceptionally well adapted to the use for which it is designed.

Other objects and advantages of the invention will become apparent during the course of the following description.

In the drawings, wherein like numerals are employed to designate like parts throughout the same, Figure 1 is a side elevation of my invention, Figure 2 is a top plan view thereof, and Figure 3 is a detail perspective of one of the spring tooth earth working elements.

In the drawings, wherein for the purpose of illustration is shown the preferred embodiment of my invention the numeral 5 designates the front and rear members and 6 the end or side members of a suitable frame, preferably rectangular in configuration. The side and front and rear members are formed from suitable angle arms, being connected at their ends by means of the bolts 7, whereby the frame may be disassembled and repaired when necessary. The frame is mounted upon a transverse crank shaped shaft 8, by means of the journals 9 carried by the end members 6. Wheels 10 are journaled on the crank portion of the shaft 8, as is clearly shown in Figure 2 of the drawings. A segmental rack 11 is carried on the top of one of the end members and is associated with a lever 12 which is keyed to the shaft 8, said lever 12 carrying a spring pressed pawl 13 engageable with the teeth of the segmental rack 11. A pivoted member 14 is mounted on the lever 12 so as to retract the spring pressed pawl 13 when it is desired to rock the shaft 8 so as to lower or raise the frame to any desired depth. When the pivoted member 14 is released, the spring pressed pawl 13 will engage the segmental rack 11, thereby holding the frame in the desired adjustment.

Mounted, by bolting or the like on the front and rear members 5 between the ends of the frame, are longitudinal spaced angle irons 15, whose vertical flanges extend at their forward ends so as to form a draft member 16. It will be noted from the drawings, that only one flange of each angle iron is extended, said flanges being bent inwardly as at 17, and extending forwardly and inwardly at an angle to a point intermediate the ends of the frame whereupon they are bent slightly so as to extend in a direction parallel to the ends of the frame.

It will further be noted that both of the members 15 are connected together by the draft member 16. The members 16 form bracing means, as well as draft means whereby the weeder may be connected to either an ordinary cultivator, or may be connected to suitable draft means whereby it may be drawn by means of horses or the like.

Intermediate the front and rear members 5 of the frame, an angle iron 18 is disposed, the same having its ends detachably bolted or connected to the ends 6, and it is to be particularly noted that one of the flanges of each of the angle irons 15 and 18 depends as is clearly illustrated in Figure 1 of the drawings. The spring teeth earth working elements 19 are carried by the depending flanges of the angle irons 5 and 18 respectively, being mounted thereon by means of the bolts 20. From an inspection of the drawings, it will be seen that the spring teeth are mounted on the angle irons in staggered relation, so as to insure the proper irritation of the earth in a given area. The spring teeth are formed from substantially flat material, each having an angular extension 20 at one end thereof, by which means it is mounted on the angle irons 5 or 18. The opposite depending end of the arcuate spring tooth 19 is reduced in size so as to form a substantially cylindrical earth working end portion 22.

In use, this invention may be connected to any suitable draft means, and by means of the lever 12 the spring teeth 19 carried by the frame may be raised or lowered to the desired depth, whereupon by the propulsion of this weeder the teeth 19 will uproot any weeds within the rows of the crop. It is to be particularly noted that the various parts of this invention may be easily and quickly disassembled for transportation or repairs.

It is to be understood that the form of my invention herewith shown and described is to be taken as the preferred embodiment of the same, and that various changes in the shape, size and arrangement of parts may be resorted to, without departing from the spirit of the invention or the scope of the subjoined claims.

Having thus described my invention, I claim:—

1. In a weeder, a frame composed of rigidly connected front and rear and side members, earth working teeth secured to the front and rear frame members, and a pair of longitudinal spaced angle irons rigidly secured on the front and rear frame members and having vertical flanges extending forwardly and inwardly from the front frame member, said extended flanges terminating in contiguous outer ends adapted for connection with draft means.

2. In a weeder, a frame composed of rigidly connected front and rear and side members, earth working teeth secured to the front and rear frame members, and a pair of longitudinal spaced angle irons rigidly secured on the front and rear frame members and having vertical flanges extending forwardly and inwardly from the front frame member, said extended flanges terminating in contiguous outer ends adapted for connection with draft means, a further transverse frame member disposed intermediate the front and rear frame members and having its ends rigidly secured to the side frame members, and further earth working teeth secured to said further intermediate frame member and disposed in longitudinal planes between the first named teeth, said spaced pair of angle irons being rigidly secured to said further intermediate frame member.

In testimony whereof I affix my signature.

EDWARD A. SCHEVING.